Patented Dec. 27, 1949

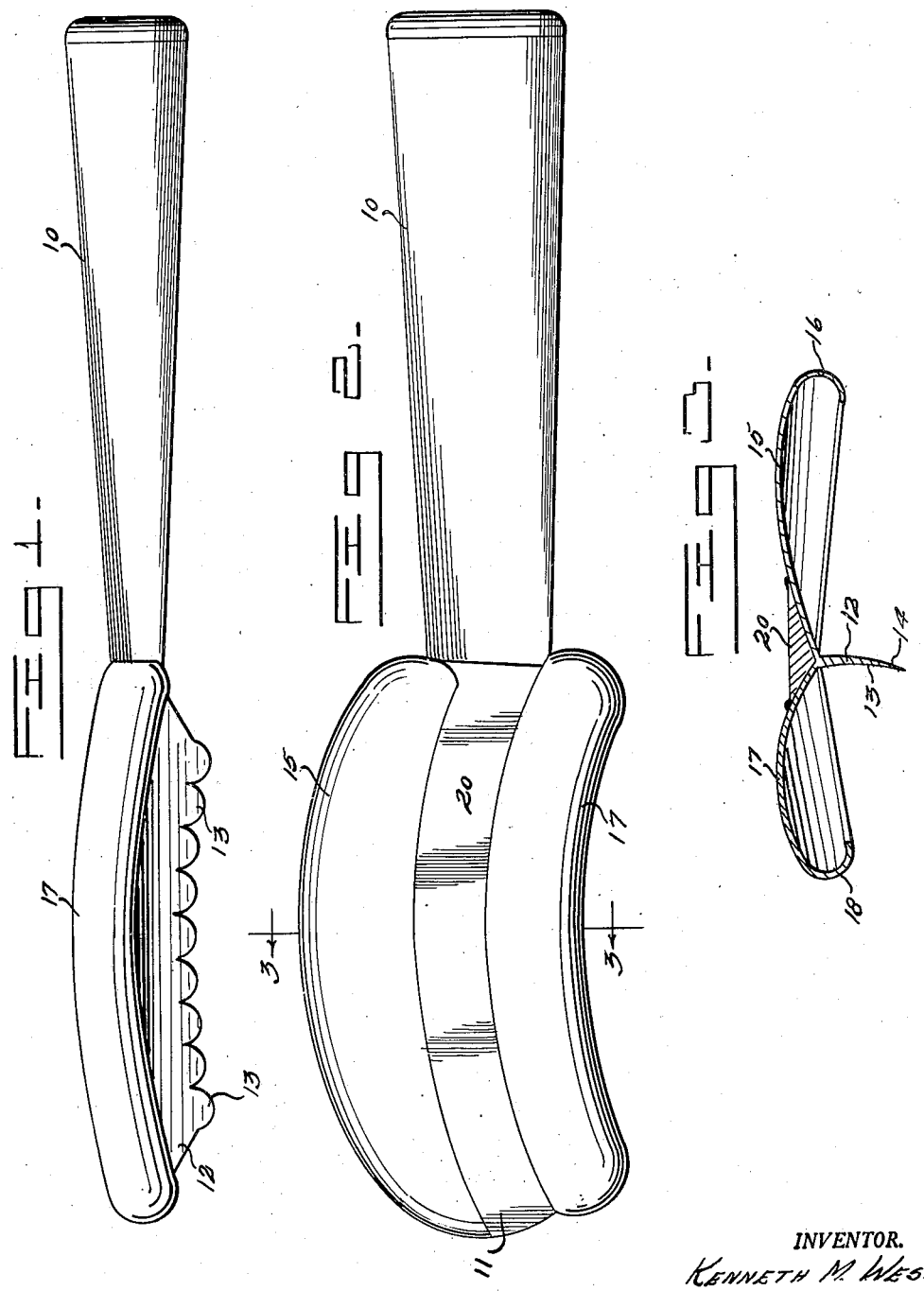

2,492,606

UNITED STATES PATENT OFFICE 2,492,606

FISH-SCALING DEVICE

Kenneth M. West, Chincoteague Island, Va.

Application August 30, 1946, Serial No. 694,035

2 Claims. (Cl. 17—7)

This invention relates to a fish-scaling device, and more particularly to such a device adapted for the scaling of a fish prior to cooking thereof.

A primary object of this invention is the provision of an improved scaler adapted to remove the scales of a fish prior to cooking with a maximum of efficiency and a minimum of effort.

An additional object of the invention is the provision of such a device provided with shields whereby the flying scales removed from the fish may be readily confined to a minimum area, and thus facilitate the cleansing of the tool, the surface on which the fish is scaled, and adjacent surroundings after scaling.

An additional object of the invention is the provision of such a device which may be manufactured and assembled with a minimum of difficulty, expense and effort, and which will be sturdy and durable in construction, reliable and efficient in operation, and relatively simple and inexpensive to manufacture and utilize.

Other objects will in part be obvious and in part be pointed out as the description of the invention proceeds, and shown in the accompanying drawings, wherein there is disclosed a preferred embodiment of this inventive concept.

In the drawings:

Figure 1 is a side elevational view of an improved fish scaler embodying features of the instant invention.

Figure 2 is a top plan view of the device disclosed in Figure 1.

Figure 3 is a sectional view taken substantially along the line 3—3 of Figure 2, as viewed in the direction indicated by the arrows.

Similar reference characters refer to similar parts throughout the several views of the drawings.

Referring now to the drawings, the device of the instant invention comprises a handle member 10 of any desired conventional configuration, to which is affixed the scaling portion proper, which comprises an arcuate member 11 extending forwardly from the handle, to the under side of which is affixed a depending flange 12, provided with a plurality of teeth 13, the extremities of which are arcuate in general configuration. Additionally, the teeth are arcuate in a vertical plane as the scraper is held towards the fish, the device adapted normally to be drawn towards the concave side of the arcuate portion in a direction against the scales of the fish, or from the tail of the fish towards the head. Additionally, the teeth are of arcuate configuration in a rearward direction transversely of the scaler, as indicated at 14 in Figure 3. Thus, the two arcs serve to provide a surface adapted to maximum efficiency in removing the scales, since the arcs in both directions, transverse and vertical, act directly against the scales and remove the same with a minimum of effort and difficulty.

Shields are provided to preclude the flying of the scales, and each shield comprises an arcuate member, the forward shield 15 being of relatively greater extent than that to the rear of the device. The shield 15 is gently curved in a horizontal plane and terminates in a substantially semi-cylindrical forward portion 16, in such manner that scales thrown forwardly by the blade during the rear scraping action thereof will be engaged by the arcuate portion 16, and retained therein, thus obviating the scattering of the scales over the table or other surface on which the fish is being scaled.

The rear shield 17 is of generally similar configuration, and includes a corresponding arcuate portion 18, but, due to the fact that fewer scales will be thrown in this direction, may be of lesser dimension.

To add strength to the device, a reinforcing grommet 20 is provided extending across the top of the depending portion 12 and its associated teeth 13, between the two shields, and is preferably of substantially triangular configuration, in order to add strength to the device per se.

From the foregoing it will now be seen that there is herein provided an improved fish scaler, which will remove scales from a fish with a minimum of difficulty and effort, and which will simultaneously preclude the scattering of such scales over a wide area. It will further be seen that this device accomplishes all the objects of this invention, and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative and not in a limiting sense.

I claim:

1. In a fish-scaling device comprising a handle, a flange connected to the latter and forming a blade with downwardly-extending scaling teeth upon the lower edge thereof, and means for shielding the blade, the features which include having the blade generally aligned with the handle with one end disposed toward the handle and the other extending from the latter, and a pair of elongated shields forming the shielding means secured to said handle and extending spaced predetermined distances from the opposite sides of said blade, the elongated shields being downwardly and inwardly arched with the lower edges thereof directed inwardly toward said blade to form scale-receiving receptacles forwardly and rearwardly of said blade.

2. In a fish-scaling device comprising a handle, a flange connected to the latter and forming a blade with downwardly-extending scaling teeth upon the lower edge thereof, and means for shielding the blade, the features which include having the blade disposed with one end directed toward and the other end extending from the handle, a pair of elongated shields which are arcuate transversely of their longitudinal dimensions and secured together with the upper edge of the blade rigidly connected to the two elongated shields at their common junction, said junction being depressed along the length of both shields, a reinforcing grommet occupying the depressed portion of said junction and extending between said shields, both shields being convexly arched downwardly and inwardly with the edges thereof extending inwardly toward each other and toward said blade upon the opposite sides of the latter to form elongated scale receptacles at both sides of said blade for receiving the scales from a fish being scraped by said blade.

KENNETH M. WEST.

REFERENCES CITED

The following references are of record in the file of this patent:

UNITED STATES PATENTS

| Number | Name | Date |
| --- | --- | --- |
| 916,725 | Lafrentz | Mar. 30, 1909 |
| 1,204,764 | Helmich | Nov. 14, 1916 |
| 1,294,609 | Boone | Feb. 18, 1919 |
| 1,728,801 | McCutcheon | Sept. 17, 1929 |
| 1,997,339 | Olson | Apr. 9, 1935 |